(12) United States Patent
Law

(10) Patent No.: US 11,435,959 B2
(45) Date of Patent: *Sep. 6, 2022

(54) NAND RAID CONTROLLER

(71) Applicant: KIOXIA CORPORATION, Tokyo (JP)

(72) Inventor: Sie Pook Law, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,040

(22) Filed: Feb. 3, 2021

(65) Prior Publication Data

US 2021/0165610 A1   Jun. 3, 2021

Related U.S. Application Data

(63) Continuation of application No. 16/436,080, filed on Jun. 10, 2019, now Pat. No. 10,942,685, which is a continuation of application No. 15/943,616, filed on Apr. 2, 2018, now Pat. No. 10,353,639, which is a continuation of application No. 14/187,849, filed on Feb. 24, 2014, now Pat. No. 9,933,980.

(51) Int. Cl.
*G06F 3/06* (2006.01)
*G06F 11/20* (2006.01)
*G06F 12/0802* (2016.01)

(52) U.S. Cl.
CPC .......... *G06F 3/0688* (2013.01); *G06F 3/0604* (2013.01); *G06F 3/0607* (2013.01); *G06F 3/0635* (2013.01); *G06F 3/0658* (2013.01); *G06F 3/0659* (2013.01); *G06F 11/2056* (2013.01); *G06F 12/0802* (2013.01)

(58) Field of Classification Search
None
See application file for complete search history.

(56) References Cited

U.S. PATENT DOCUMENTS

| | | | |
|---|---|---|---|
| 5,742,792 | A | 4/1998 | Yanai et al. |
| 6,249,851 | B1 | 6/2001 | Richardson et al. |
| 7,194,568 | B2 | 3/2007 | Jeter, Jr. et al. |
| 7,292,573 | B2 | 11/2007 | LaVigne et al. |
| 7,558,900 | B2 | 7/2009 | Jigour et al. |
| 7,685,390 | B2 | 3/2010 | Fujita et al. |
| 7,934,055 | B2 | 4/2011 | Flynn et al. |
| 8,009,475 | B2 | 8/2011 | Grimsrud |

(Continued)

OTHER PUBLICATIONS

Webopedia, "Big-Endian", Sep. 3, 2013, pp. 1-2, https://web.archive.org/web/20130903171148/http://www.webopedia.com/TERM/B/big_endian.html.

(Continued)

*Primary Examiner* — Christopher D Birkhimer
(74) *Attorney, Agent, or Firm* — Kim & Stewart LLP

(57) ABSTRACT

An array controller for connection between a solid state drive controller and multiple non-volatile storage units is provided. The array controller comprises a plurality of enable outputs, each of which is connected to an enable input of one of the non-volatile storage units, and a buffer in which data to be written into or read from the non-volatile storage units is stored. The array controller further comprises a control unit configured to enable a communication path between the solid state drive controller and one of the non-volatile storage units according to an address received from the solid state drive controller.

15 Claims, 9 Drawing Sheets

(56) References Cited

U.S. PATENT DOCUMENTS

| | | |
|---|---|---|
| 8,019,938 B2 | 9/2011 | Flynn et al. |
| 8,285,927 B2 | 10/2012 | Flynn et al. |
| 8,368,418 B2 | 2/2013 | Hasegawa |
| 8,370,565 B2 | 2/2013 | Hung |
| 8,412,904 B2 | 4/2013 | Flynn et al. |
| 8,438,356 B2 | 5/2013 | Yoon et al. |
| 8,484,415 B2 | 7/2013 | Cho |
| 8,489,817 B2 | 7/2013 | Flynn et al. |
| 8,495,292 B2 | 7/2013 | Flynn et al. |
| 8,527,693 B2 | 9/2013 | Flynn et al. |
| 8,554,988 B2 | 10/2013 | Kitahara |
| 8,578,127 B2 | 11/2013 | Thatcher et al. |
| 8,645,656 B2 | 2/2014 | Yoon et al. |
| 2004/0186945 A1 | 9/2004 | Jeter et al. |
| 2009/0055002 A1 | 2/2009 | Anderson et al. |
| 2009/0204758 A1 | 8/2009 | Luning |
| 2009/0327803 A1 | 12/2009 | Fukutomi et al. |
| 2010/0100664 A1 | 4/2010 | Shimozono |
| 2010/0211737 A1 | 8/2010 | Flynn et al. |
| 2011/0010490 A1 | 1/2011 | Kwon et al. |
| 2011/0082985 A1 | 4/2011 | Haines et al. |
| 2011/0179225 A1 | 7/2011 | Flynn et al. |
| 2011/0191520 A1 | 8/2011 | Kano et al. |
| 2011/0213921 A1 | 9/2011 | Yu et al. |
| 2011/0289267 A1 | 11/2011 | Flynn et al. |
| 2011/0302358 A1 | 12/2011 | Yu et al. |
| 2011/0314239 A1 | 12/2011 | Kono et al. |
| 2012/0066432 A1 | 3/2012 | Miura |
| 2012/0159052 A1 | 6/2012 | Lee et al. |
| 2012/0233380 A1 | 9/2012 | Butterfield |
| 2012/0233386 A1 | 9/2012 | Tong et al. |
| 2012/0233433 A1 | 9/2012 | Grunzke |
| 2012/0246449 A1 | 9/2012 | Assarpour et al. |
| 2012/0254500 A1 | 10/2012 | Cho et al. |
| 2012/0254501 A1 | 10/2012 | Cho et al. |
| 2012/0311193 A1 | 12/2012 | Erdmann et al. |
| 2012/0311232 A1 | 12/2012 | Porterfield |
| 2012/0317334 A1 | 12/2012 | Suzuki et al. |
| 2012/0324152 A1 | 12/2012 | Lai et al. |
| 2013/0003470 A1 | 1/2013 | Pyeon et al. |
| 2013/0042024 A1 | 2/2013 | Pyeon et al. |
| 2013/0042053 A1 | 2/2013 | Huang |
| 2013/0086304 A1 | 4/2013 | Ogawa et al. |
| 2013/0097367 A1 | 4/2013 | Flynn et al. |

OTHER PUBLICATIONS

Apple Computer, "Endianness and Addressing", Apr. 4, 2006, pp. 1-4, https://developer.apple.com/library/content/documentation/DeviceDrivers/Conceptual/WritingPCIDrivers/endianness/endianness.html.

Annonymous, "Basic UART Question", Feb. 15, 2002, pp. 1-3, http://www.avrfreaks.net/forum/basic-uart-question.

Jim Handy, "The Cache Memory Book: The Authoritatice Reference on Cache Design", Second Edition, 1998, pp. 8-23, 204-205, and 220-221.

Webopedia, "Bus", Apr. 5, 2001, pp. 1-3, https://web.archive.org/web/20010405164309/https://www.webopedia.com/TERM/B/bus.html (Year: 2001).

Webopedia, "Transmission Path", Jun. 3, 2004, pp. 1-2, https://web.archive.org/web/20040603103442/https://www.webopedia.com/TERM/T/transmission_path.html (Year: 2004).

Webopedia, "Communications", Apr. 10, 2001, pp. 1-2, https://web.archive.org/web/20010410061112/https://www.webopedia.com/TERM/C/communications.html (Year: 2001).

Webopedia, "Backup", Sep. 4, 2002, pp. 1-2, https://web.archive.org/web/20020904183938/https://www.webopedia.com/TERM/B/backup.html (Year: 2002).

Webopedia, "Data Mirroring", Aug. 8, 2002, pp. 1-2, https://web.archive.org/web/20020808151852/https://www.webopedia.com/TERM/D/data_mirroring.html (Year: 2002).

Webopedia, "Redundant", Apr. 21, 2003, pp. 1-2, https://web.archive.org/web/20030421143349/https://www.webopedia.com/TERM/R/redundant.html (Year: 2003).

NAND RAID CONTROLLER

CROSS-REFERENCE TO RELATED APPLICATION

This application is a continuation of U.S. patent application Ser. No. 16/436,080, filed on Jun. 10, 2019, which application is a continuation of U.S. patent application Ser. No. 15/943,616, filed on Apr. 2, 2018, now U.S. Pat. No. 10,353,639, issued on Jul. 16, 2019, which application is a continuation of U.S. patent application Ser. No. 14/187,849, filed on Feb. 24, 2014, now U.S. Pat. No. 9,933,980, issued on Apr. 3, 2018, the entire contents of which are incorporated herein by reference.

BACKGROUND

The storage capacity of solid state drives (SSDs) continues to increase. That is, SSDs are able to support an increasing number of storage units, such as NAND flash memory units. As the storage capacity of SSDs increases, it has become increasingly difficult to scale SSD controllers, which are typically implemented on integrated circuit chips, and which are used to store data to NAND flash memory units and to read data from NAND flash memory units through general-purpose input/output (or GPIO) pins and through chip enable (or CE) pins.

As present-day drive storage devices support an increasing number of NAND flash memory units, (i.e., greater than 2 terabytes of storage capacity), a large number of connections from an SSD controller to the NAND flash memory units of the disk storage device is required. However, allocating additional GPIO and CE pins is disadvantageous, because allocating more pins increases the size of the die package required for manufacturing the SSD controller. Thus, the cost of manufacturing the SSD controller would increase dramatically. Further, laying out an SSD controller integrated circuit comprising additional NAND flash memory pin connections would also be costly and disruptive to current SSD controller manufacturing processes. Hence, it would be advantageous to provide a mechanism whereby existing SSD controllers can support drives that have NAND flash memory capacity in excess of 2 terabytes without allocating additional GPIO or CE pins for connection to a large number of NAND flash memory units.

SUMMARY OF THE DISCLOSURE

An array controller for connection between a solid state drive controller and multiple non-volatile storage units, according to an embodiment, comprises a plurality of enable outputs, each of which is connected to an enable input of one of the non-volatile storage units and a buffer in which data to be written into or read from the non-volatile storage units is stored. The array controller further comprises a control unit configured to enable a communication path between the solid state drive controller and one of the non-volatile storage units according to an address received from the solid state drive controller.

According to another embodiment, a method of performing read and write operations in a memory system is provided. The memory system includes a solid state drive controller connected to multiple non-volatile storage units by way of an array controller having a plurality of enable outputs, each of which is connected to an enable input of one of the non-volatile storage units. The array controller also includes a buffer in which data to be written into or read from the non-volatile storage units is stored. The method comprises the steps of receiving an address from the solid state drive controller and enabling a communication path between the solid state drive controller and one of the non-volatile storage units according to the received address.

According to another embodiment, a memory system is provided. The memory system comprises a solid state drive controller configured with one or more chip enable outputs, and an array controller configured with a chip enable input that is connected to one of the chip enable outputs of the solid state drive controller. The array controller has multiple chip enable outputs and a buffer in which data to be written into or read from the non-volatile storage units is stored. The memory system further comprises multiple non-volatile storage units each configured with a chip enable input that is connected to one of the chip enable outputs of the array controller.

DETAILED DESCRIPTION

Figure 1:
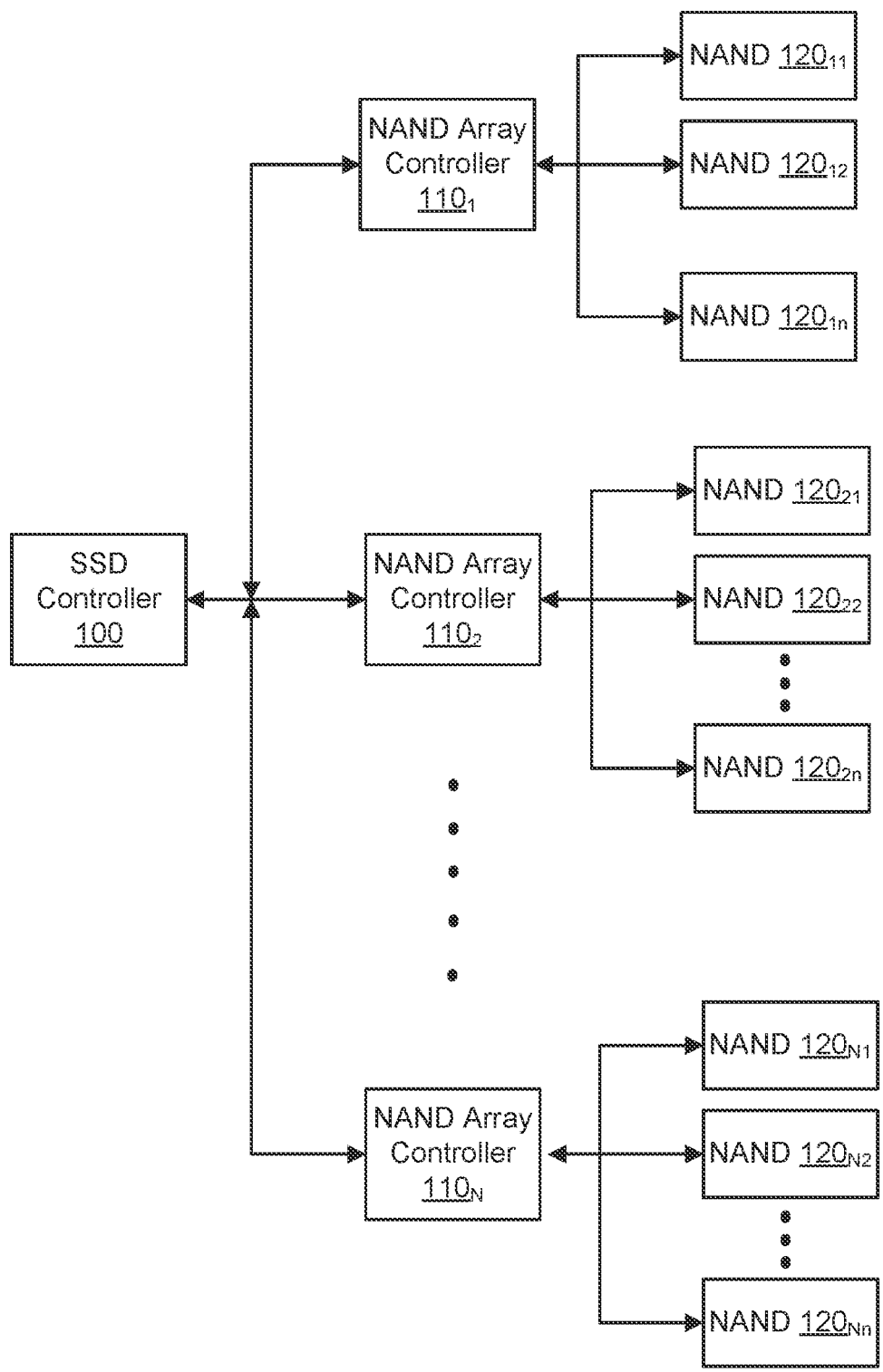
FIG. 1 is a block diagram that depicts a memory system according to one or more embodiments.

FIG. 1 is a block diagram that depicts a memory system according to one or more embodiments. The system depicted in FIG. 1 comprises a solid state disk (SSD) controller 100, a plurality of NAND array controllers 110, and a plurality of NAND storage devices 120. In embodiments, SSD controller 100 is an electronic device that provides a connected host computer access to NAND memory components. Typically, SSD controller 100 is a semiconductor processor that executes firmware-level code, and which performs various functions, including reading and writing data from and to NAND memory components, caching, error correction, data encryption, and garbage collection. SSD controller 100 communicates with other devices by way of electrical signals, which are typically received and transmitted through "pin" connections. Each pin is capable of transmitting or receiving an electrical signal which represents a binary 0 or 1 value (or bit value). Typically, a 0 value is represented by a low voltage signal, while a 1 value is represented by a high voltage signal. Pins may be categorized, in embodiments, as general purpose input/output (or GPIO) pins, which typically transmit and receive data to be read from or stored to memory. In addition, GPIO pins of SSD controller 100 transmit and receive address data that refers to storage locations within a NAND storage device 120. SSD controllers 100 also include "chip enable" (or CE) pins. CE pins are typically used to activate one or more devices to which an SSD controller 100 is connected. For example, SSD controller 100 may be connected to an array of NAND storage devices 120. In order to activate a communication path to one of the NAND storage devices 120, SSD controller 100 transmits a particular value (either a 0 or 1) over a CE pin that is coupled to a corresponding CE pin of the target NAND storage device 120. In some embodiments, transmitting a 0 value activates a communication path to a target NAND storage device 120. In other embodiments, transmitting a 1 value activates a communication path to a target NAND storage device 120. Once a communication path to the target NAND storage device 120 is activated (or "enabled"), SSD controller 100 may then transmit data to and read data from the target NAND storage device 120. The transmission of a value over a CE pin in order to activate a communication path to a device to which SSD controller 100 is connected is referred to herein as "asserting" the CE pin.

As shown in FIG. 1, SSD controller 100 is connected to one or more NAND array controllers 110. Each NAND array controller 110 is configured to be activated by SSD controller 100 (in embodiments, activation is achieved through assertion of a CE pin of the NAND array controller 110 that is connected to a corresponding CE pin of SSD controller 100). According to one or more embodiments, each NAND array controller 110 is equipped with electronic circuitry, firmware, or software that enables it to select one or more NAND storage devices 120 in order to establish a communication path between SSD controller 100 and the selected NAND storage devices 120. In embodiments, SSD controller 100 transmits a command, one or more addresses, and storage data to a NAND array controller 110, where the transmitted command, addresses, and storage data are targeted to one of the NAND storage devices 120. As will be described further herein, SSD controller 100 provides data to NAND array controller 110 that enables NAND array controller 110 to identify which of the NAND storage devices 120 that is to receive the transmitted command, addresses, and storage data. In embodiments, SSD controller 100 transmits additional address information to NAND array controller 110 that serves to identify one or more target NAND storage devices 120. NAND array controller 110 uses this additional address information to enable a communication path to the target NAND storage device 120. NAND array controller 110 subsequently transmits the command, addresses, and data to that target device.

As is further shown in FIG. 1, each NAND array controller 110 is connected to one or more NAND storage devices 120. As previously mentioned, a NAND array controller 110 receives address information from SSD controller 110 that enables NAND array controller 110 to identify one or more NAND storage devices 120 to which the NAND array controller 110 is connected. After identifying a target NAND storage device 120, NAND array controller 110 is enables a communication path between SSD controller 100 and the target NAND storage device 120. Further, enablement of a communication may be performed, in one or more embodiments, by asserting an output CE pin of the NAND array controller 110 that is connected to a corresponding CE pin of the target NAND storage device 120.

In embodiments, each NAND storage device 120 is a non-volatile semiconductor memory device, where stored data persists even when the device is not electrically powered. Typically, each NAND storage device 120 includes transistors that are connected in groups to a word line, which allows for high-capacity data storage. Each NAND storage device 120 is equipped with a CE pin that allows a communication path to the device to be enabled, as well as GPIO pins that serve to transmit and receive commands, addresses, and I/O data to and from the device.

Figure 2:
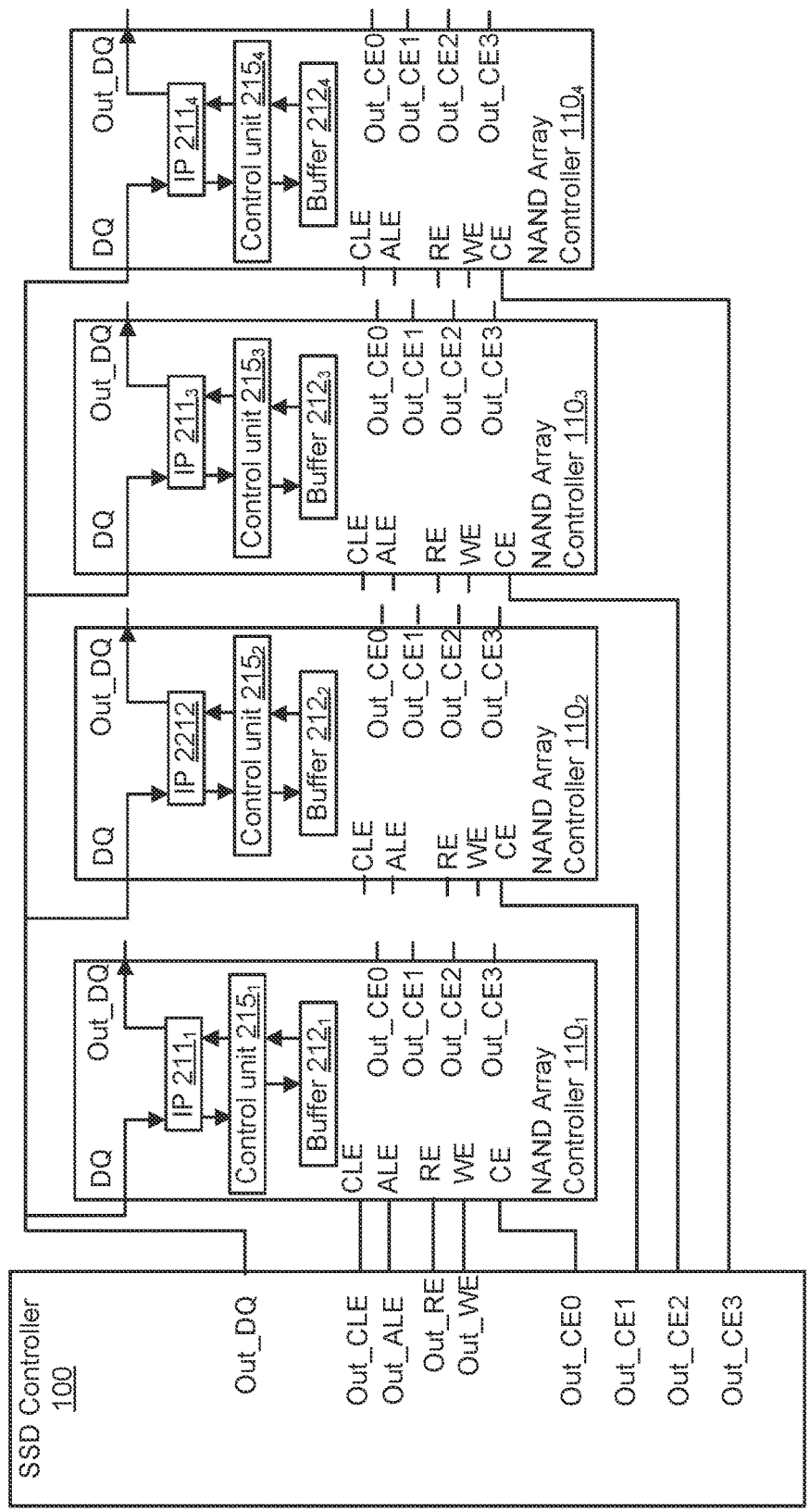
FIG. 2 is a block diagram that depicts a connection between an SSD controller and a plurality of NAND array controllers, according to one or more embodiments.

FIG. 2 is a block diagram that depicts a connection between an SSD controller 100 and a plurality of NAND array controllers 110, according to one or more embodiments. As shown, SSD controller 100 includes a plurality of output pins, which are denoted in FIG. 2 with the prefix "Out." SSD controller 100 includes an Out_DQ pin, which, in embodiments, may comprise 1, 8, or more physical pins. The pins that comprise Out_DQ may be referred to as a "data bus." Data is transmitted over Out_DQ, where the transmitted data may be I/O data to be stored at a storage location within a NAND storage device 120. Further, data transmitted over Out_DQ may be a command to be executed by a NAND storage device 120. In addition, data transmitted over Out_DQ may be address data, which, in embodiments, may refer to one of the NAND storage devices 120 that is connected to NAND array controller 110, or, alternatively, to storage locations within a particular NAND storage device 120. As is depicted in FIG. 2, Out_DQ is connected in parallel to each of four NAND array controllers $110_{1-4}$. Out_DQ of SSD controller 100 is connected to a corresponding DQ pin (or plurality of pins) of each NAND array controller 110, which allows all data transmitted over the data bus to be received by each NAND array controller 110, provided a communication path to the NAND array controller 110 is activated.

In FIG. 2, SSD controller 100 also includes Out_CLE and Out_ALE pins. These pins are connected to corresponding CLE and ALE pins of each NAND array controller 110. The function of the Out_CLE and Out_ALE pins is to communicate the nature of data to be communicated to a target device (e.g., a NAND storage device 120 or a NAND array controller 110) at some future time. In embodiments, pins are asserted and data is transmitted over a data bus at discrete points in time, referred to as "clock cycles." In one or more embodiments, SSD controller 100 is equipped with a clock signal generator (not shown in FIG. 2) which allows for the synchronization of pin assertions, data transmissions, command execution by target devices, and the like. Thus, during a given clock cycle, the Out_CLE and Out_ALE pins are asserted according to a pattern. Possible patterns are 00, 01, and 10, where the high-order bit corresponds to the assertion of the CLE pin and the low-order bit corresponds to the ALE pin assertion. This assertion communicates to a target device the type of data that is to be transmitted over the data bus (i.e, through Out_DQ to the DQ pins of the target device) in a subsequent clock cycle.

For example, in one or more embodiments, SSD controller 100 asserts a 0 (or low voltage) on both the Out_CLE pin and Out_DQ pin. This assertion (i.e "00") communicates to the target NAND device (NAND array controller $110_1$ in FIG. 2) that, during a subsequent clock cycle, I/O data to be stored in a NAND storage device 120 is to be transmitted over the data bus.

Continuing with the example, SSD controller 100 may also assert a 1 (or high voltage) on the Out_CLE pin and a 0 on the Out_ALE pin. In the depiction shown in FIG. 2, this communicates to the target device (i.e. NAND array controller $110_1$) that a command to be executed by a target device is to be transmitted over the data bus during a future clock cycle. Indeed, "CLE" typically stands for Command Latch Enable, and signifies that a command is to be transmitted by a source device and is to be expected (and executed) by a target device.

Further, in embodiments, SSD controller 100 may assert a 0 on the Out_CLE pin and a 1 on the Out_ALE pin. This pattern communicates to a target device that an address is to be transmitted on the data bus during a future clock cycle. Indeed, "ALE" typically stands for Address Latch Enable, which denotes that a target device is to receive the transmission of an address by a source device over the data bus. An example of an address is a storage location inside of a NAND storage device 120. Further, in one or more embodiments, a transmitted address may also identify a NAND storage device 120 that is connected to a NAND array controller 110.

As shown in FIG. 2, SSD controller 100 also includes Out_RE and Out_WE pins. An Out_RE pin is a "read enable" pin. The Out_RE pin is connected to a corresponding RE pin of a NAND array controller 110. In FIG. 2, the Out_RE pin of SSD controller 100 is connected to the RE pin of NAND array controller $110_1$. In embodiments, the signal transmitted over the Out_RE pin communicates to a target device (typically a NAND storage device 120) to output a data value located at a particular storage location within the target device, and to increment an internal address counter to reference a subsequent storage location within the target device. The Out_WE pin is a "write enable" pin. In FIG. 2, the Out_WE pin of SSD controller 100 is connected to the WE pin of NAND array controller $110_1$. In embodiments, the signal transmitted over the Out_WE pin triggers a target device (i.e., a NAND storage device 120 or NAND array controller 110) to read data from the data bus (i.e., the data pins comprising DQ) in a subsequent clock cycle. This process may be referred to as "clocking" data into the target device (e.g., addresses, I/O data, or commands). In embodiments, a target NAND array controller 110 (or NAND storage device 120) reads the data transmitted to it over the data bus at the rising edge of the signal transmitted over the Out_WE pin.

In addition, SSD controller 100 includes a plurality of Out_CE pins. As previously mentioned, CE typically stands for "chip enable." As shown in FIG. 2, SSD controller 100 includes four output CE pins, namely, Out_CE0, Out_CE1, Out_CE2, and Out_CE3. In other embodiments, SSD controller 100 may include greater or fewer output CE pins. As shown, each of the Out_CE pins of SSD controller 100 is connected to a corresponding CE pin of a NAND array controller 110. Thus, in FIG. 2, Out_CE0 is connected to the CE pin of NAND array controller $110_1$, Out_CE1 is connected to the CE pin of NAND array controller $110_2$, Out_CE2 is connected to the CE pin of NAND array controller $110_3$, and Out_CE 3 is connected to the CE pin of NAND switch $110_4$. In embodiments, SSD controller 100 asserts one or more Out_CE pins in order to activate (or enable) a communication path to the NAND array controllers 110 that are connected to the asserted Out_CE pins. For example, SSD controller 100 asserts Out_CE0 in order to activate a communication path to NAND array controller $110_1$. It should be noted that, until a communication path to a NAND array controller 110 has been activated (or "enabled") by way of assertion of a CE pin, such NAND array controller 110 will not recognize any data transmitted to it over the data bus (i.e., its corresponding DQ pins), nor will it recognize the assertion of its CLE, ALE, RE, or WE pins. Further, SSD controller 100 may also "de-assert" any or all of its Out_CE pins in order to deactivate an already active communication path to a NAND array controller 110. In one or more embodiments, de-assertion of a NAND array controller 110 may be performed by asserting a 0 value (or low voltage) on the Out_CE pin that is connected to the CE pin of the NAND array controller 110 for which a communication path is to be deactivated.

As was previously described, each of the NAND array controllers 110 depicted in FIG. 2 includes pins DQ, CLE, ALE, RE, WE, and CE, which are coupled to corresponding output pins of SSD controller 100. Further, each of the NAND array controllers 110 includes output pins that transmit data to other devices that the NAND array controllers 110 are connected to. According to the embodiment depicted in FIG. 2, each NAND array controller 100 includes an Out_DQ pin (or set of pins, as the case may be), which is an output data bus for the switch. Thus, in embodiments, data that is received by a NAND array controller 110 over the data bus through pins DQ is subsequently transmitted to other devices over pins Out_DQ. Further, each NAND array controller 110 depicted includes four Out_CE pins, namely, Out_CE0, Out_CE1, Out_CE2, and Out_CE3. These CE pins perform a function that is similar that of the Out_CE pins of SSD controller 100, namely, to activate a communication path to a device to which a particular Out_CE pin is connected. Such a device is typically a NAND storage device 120, although connection from a NAND array controller 110 to other types of electronic devices is contemplated and is within the scope of the present invention. Further, although each NAND array controller 110 is depicted as having four Out_CE pins, it should be noted that other embodiments include more or fewer Out_CE pins than the embodiment depicted in FIG. 2. Further, NAND array controllers 110 may also include other output pins (such as clock signal pins, as well as ALE and CLE pins), and it is noted that such embodiments are also within the scope of the present invention.

In addition, each of the NAND array controllers 110 depicted in FIG. 2 includes an interface protocol (IP) 211, a control unit 215, and a buffer 212. IP 211 receives data, addresses, and commands transmitted by SSD controller 100 over the data bus (which is connected to pins DQ of the NAND array controllers 110). IP 211 converts the received data, addresses, and commands from a protocol format used by SSD controller 100 into a format that is used by control unit 215 of each NAND array controller 110. In one or more embodiments, SSD controller 100 transmits using a specific protocol, such as Toggle/ONFI. According to such embodiments, IP 211 translates storage data, addresses, and commands from the Toggle/ONFI format into a format that enables control unit 215 to store and manipulate the transmitted data. In addition, embodiments of IP 211 are configured to receive the components of a transmission from SSD controller 100 (i.e., commands, addresses, and storage data) over multiple clock cycles. Once the transmission has been received and translated by IP 211, IP 211 transmits the translated data to control unit 215.

Control unit 215 receives data from IP 211 and processes and stores that data in buffer 212. The processing performed by control unit 215 is described in further detail below. Note that data also flows from control unit 215 into IP 211. In this case, IP 211 translates the data received from control unit 215 into a protocol (e.g., Toggle/ONFI) and then transmits the data over the output data bus over pins Out_DQ.

Figure 3:
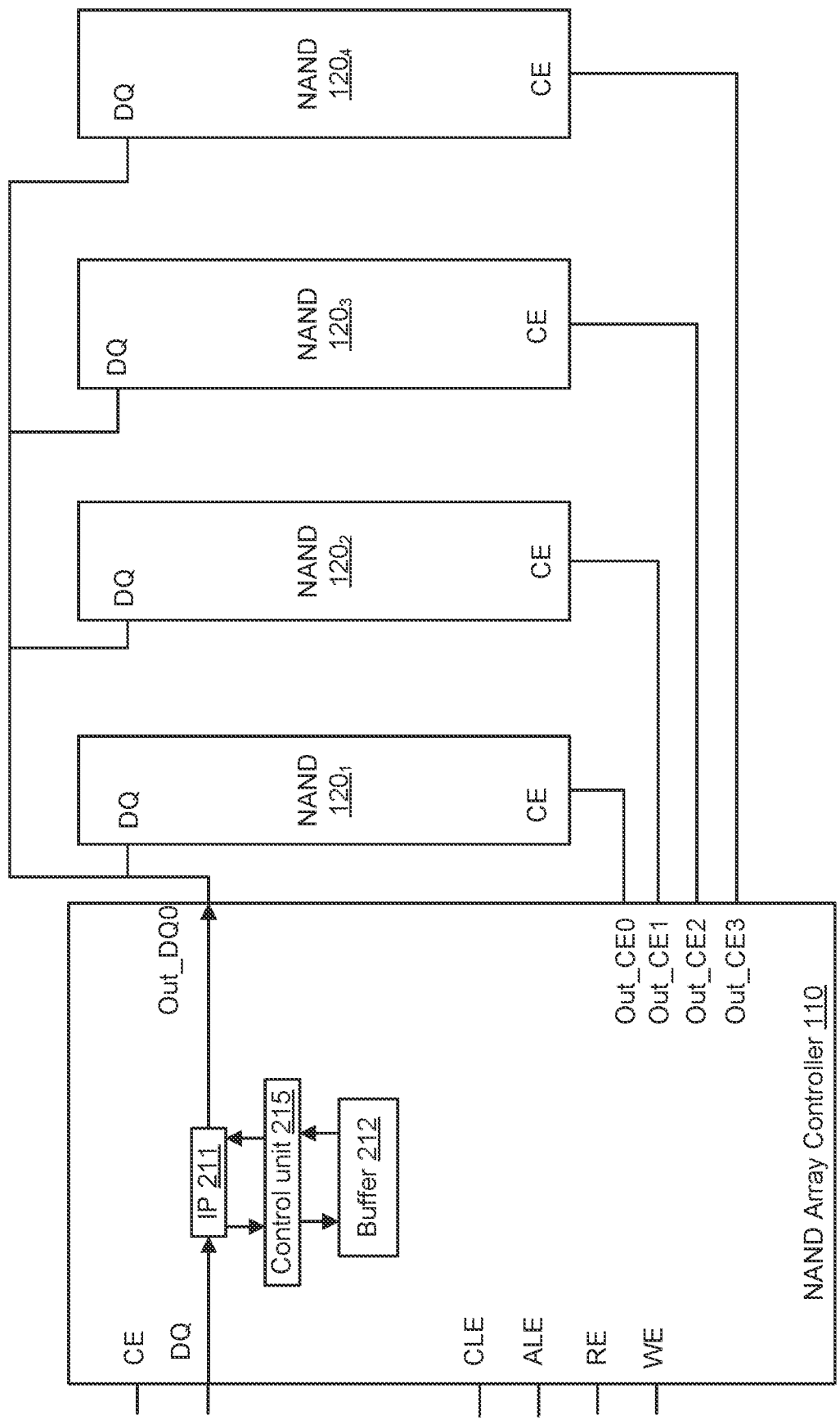
FIG. 3 is a block diagram that depicts a connection between a NAND array controller and a plurality of NAND storage devices, according to one or more embodiments.

FIG. 3 is a block diagram that depicts a connection between a NAND array controller 110 and a plurality of NAND storage devices 120, according to one or more embodiments. In the embodiment depicted in FIG. 3, a single NAND array controller 110 is connected to four NAND storage devices $120_1$-$120_4$. As was also shown in FIG. 2, NAND array controller 110 has an input CE pin (over which communication to NAND array controller 110 is activated), as well as CLE, ALE, RE, and WE pins. The functionality of each of these pins is the same as described previously with respect to FIG. 2. In addition, NAND array controller 110 includes an Out_DQ pin (or set of pins), which serves as an output data bus for the switch. As shown, Out_DQ is connected in parallel to each of the NAND storage devices $120_{1-4}$. The data bus is connected to each of the NAND storage devices 120 at a corresponding DQ pin for each of the storage devices. The NAND array controller 110 also includes Out_CE pins that are each connected to a CE pin of the NAND storage devices 120. Thus, as shown, Out_CE0 is connected to the CE pin of NAND storage device $120_1$, Out_CE1 is connected to the CE pin of NAND storage device $120_2$, Out_CE2 is connected to the CE pin of NAND storage device $120_3$, and Out_CE3 is connected to the CE pin of NAND storage device $120_4$.

As shown in FIG. 3, NAND array controller 110 receives a transmission (i.e., storage data, addresses, and commands) from SSD controller 100 over the data bus through pins that comprise DQ. In embodiments, SSD controller 100 transmits this data according to a communication protocol. An example of such a protocol is Toggle/ONFI. According to the transmission protocol, SSD controller 100 notifies NAND array controller 110 as to the type of data that will be transmitted over DQ during a subsequent clock cycle. In embodiments, SSD controller 100 asserts the CLE and ALE pins of NAND array controller 110 in order to indicate the type of data that will be transmitted. For example, if SSD controller asserts the CLE pin and does not assert the ALE pin, then the data to be transmitted to NAND array controller 110 over DQ at a subsequent clock cycle is a command. If, on the other hand, SSD controller asserts the ALE pin and does not assert the CLE pin, then the data to be transmitted to NAND array controller 110 over DQ during a subsequent clock cycle is an address. Finally, if SSD controller asserts neither the ALE nor the CLE pin of NAND array controller 110, then the data to be transmitted over DQ to NAND array controller 110 at a future clock cycle is data that is to be stored in a NAND storage device 120 that NAND array controller 110 is connected to.

When data is received by NAND array controller 110 over DQ, the data flows to IP 211, which converts the data from a communication protocol format (e.g., Toggle/ONFI), into a format that is used by control unit 215. This conversion enables NAND array controller 110 to store the received commands storage data, and addresses, determine a destination NAND storage device 120 for the received data, enable a communication path to the destination NAND storage device 120, and transmit the received data over Out_DQ to the destination NAND storage device 120.

After converting the received data, IP 211 then transmits the converted data to control unit 215. Control unit 215 stores the data in buffer 212. In embodiments, buffer 212 is an area of storage within NAND array controller 110 that is capable of storing a complete command transmission from SSD controller 100. A complete command transmission as referred to herein is a command code (or "op code"), one or more addresses, and data that are transmitted to a NAND storage device 120 in order to cause the NAND storage device to perform a particular function. Such functions include, but are not limited to, reading data from storage, writing data to storage, or resetting a NAND storage device 120. For example, SSD controller 100 transmits a series of data bytes in order to cause a NAND storage device 120 to write data to one or more of its storage locations. In such a case, SSD controller 100 first transmits a command code (or op code) over the data bus (after asserting Out_CLE and de-asserting Out_ALE). The command op code is typically a one- or two-byte sequence of bits that is recognized as a write command by a target NAND storage device 120. In addition, SSD controller 100 transmits one or more addresses of storage locations to which a target NAND storage device is to write data. It is to be noted that SSD controller transmits such addresses after asserting pin ALE and de-asserting pin CLE. Finally, the complete command transmission includes storage data to be written to the aforementioned storage locations of the target NAND storage device 120. Prior to transmitting the storage data, SSD controller 100 de-asserts both ALE and CLE pins. Thus, each of the aforementioned data transmissions (i.e., the write command op code, the one or more addresses, and the storage data) are transmitted by SSE controller 100, received over DQ by IP 211, and stored by control unit 215 into buffer 212.

Further, in embodiments, SSD controller 100 transmits an additional address, along with the addresses that reference storage locations in the target NAND storage device 120. The additional address identifies a particular NAND storage device 120 that is connected to NAND array controller 110. For example, in the embodiment depicted in FIG. 3, SSD controller 100 asserts pin ALE and de-asserts pin CLE, to indicate that an address is to be transmitted on the data bus during a subsequent clock cycle. SSD controller then transmits a hexadecimal value (typically, one byte in length) that is used by NAND array controller 110 to identify a target NAND storage device 120. It is to be noted that the additional address does not refer to any of the storage locations within any of the NAND storage devices 120 and, thus, would not be recognized by those devices. Rather, the additional address is used by NAND array controller 110 to select a target NAND storage device 120.

As previously mentioned, control unit 215 stores the complete command transmission, that is, the command op code, addresses, and storage data into buffer 212. Next, control unit 215 processes the transmission saved to buffer 215 in order to determine which of the NAND storage devices 120 connected to NAND array controller 110 is to receive the transmission. To determine a target NAND storage device 120, NAND array controller 110 examines the additional address that identifies a particular NAND storage device 120, which, as previously mentioned, is stored in buffer 212. For example, control unit 215 may determine that the additional address comprises a certain hexadecimal value (e.g., the hexadecimal value AA). In embodiments, control unit 215 is configured to associate such a value with a particular NAND storage device 120. For example, control unit 215 may determine that the hexadecimal value AA identifies NAND storage device 120$_1$. After making the determination, control unit 215 enables a communication path from NAND array controller 110 to the target NAND storage device 120 by asserting the appropriate Out_CE pin. In the example just described, NAND array controller 110 asserts Out_CE1, which is connected to the CE pin of NAND storage device 120$_1$. Thus, a communication path from NAND array controller 110 to NAND storage device 120$_1$ is thereby enabled.

Next, after a communication path to a target NAND storage device 120 is enabled, control unit 215 reads the components of the complete command transmission received from SSD controller 100 (and stored in buffer 212), with the exception of the additional address that identifies the target NAND storage device 120. As previously mentioned, this identifying address is not recognized by a NAND storage device 120 as referring to any storage locations therein. Control 215 transmits the transmission data (except the additional address) from buffer 212 to IP 211, where IP 211 converts the data into a format that is in accordance with the data protocol that SSD controller 100 uses to communicate with target NAND devices. As previously mentioned, one such protocol is the Toggle/ONFI protocol. Thus, IP 211 receives the data from control unit 215, converts it, and transmits it over Out_DQ to the target NAND storage device 120. In one embodiment, IP 211 performs this transmission in accordance with Toggle/ONFI. Data transmissions in accordance with the Toggle/ONFI protocol are performed in different types of cycles, depending on the type of data that is transmitted. For example, commands are transmitted in command cycles, addresses are transmitted in address cycles, and data is transmitted in data cycles. To transmit data, IP 211 appropriately asserts ALE and CLE pins (not shown) of the NAND array controller 110 (not shown), which are connected to corresponding ALE and CLE pins of a target NAND storage device 120. Thus, after asserting the ALE and CLE pins, the target NAND storage device 120 is informed that a command, address, or storage data is to be transmitted over the data bus during a subsequent clock cycle. In one or more embodiments, IP 211 is configured to assert an output CLE pin of NAND array controller 110 and to de-assert an output ALE pin of NAND array controller 110 during a first clock cycle. During a second subsequent clock cycle, IP 211 transmits the write command op code (i.e., the write command op code transmitted by SSD controller 100 and stored in buffer 212). It should be noted that a target NAND storage device 120 receives the transmitted command op code because control unit 215 previously asserted the CE pin of the target NAND storage device 120.

In like manner, after transmitting the command op code, IP 211 asserts the ALE pin and de-asserts the CLE pin of NAND array controller 110 during a first clock cycle and transmits addresses of storage locations within a target NAND storage device 120 to NAND storage device over Out_DQ. Finally, IP 211 is configured to de-assert both the ALE and CLE pins of NAND array controller 110 during a first clock cycle and to transmit storage data over Out_DQ in a subsequent clock cycle.

Figure 4A:
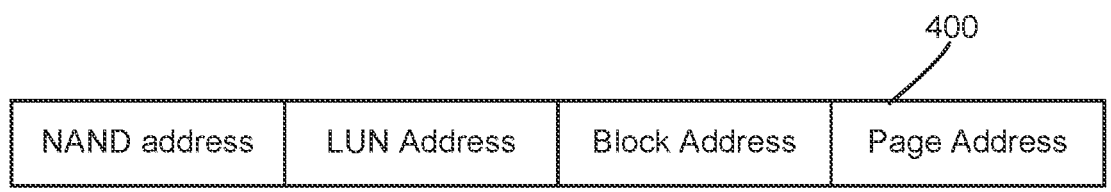
FIG. 4A is a block diagram that depicts address components that are transmitted from an SSD controller to a NAND array controller, according to one or more embodiments.

FIG. 4A is a block diagram that depicts address components that are transmitted from SSD controller 100 to NAND array controller 110, according to one or more embodiments. As shown, address 400 is comprised of different segments, each of which is transmitted by SSD controller 100 during a separate clock cycle, each referred to as an address cycle. Note that an address cycle is preceded by SSD controller 100 asserting the Out_ALE pin and de-asserting the Out_CLE pin, which, according to data transmission protocols (such as Toggle/ONFI), communicates to a target device that an address is to be transmitted over the data bus during a subsequent clock cycle. In FIG. 4, the first segment of address 400 is referred to as a NAND address. A NAND address is the aforementioned additional address transmitted by SSD controller 100, which identifies a particular NAND storage device 120 that is connected to a NAND array controller 110. A NAND address is used by a NAND array controller 110 to enable a communication path to the target NAND storage device identified by the NAND address. Thus, for example, referring to FIG. 3, a hexadecimal value of AA may identify NAND storage device 120$_1$, a value of BB may refer to NAND storage device 120$_2$, a value of CC may refer to NAND storage device 120$_3$, and a value of DD may refer to NAND storage device 120$_4$. As mentioned earlier, the NAND address is stored in buffer 212 by control unit 215. After storing the NAND address, control unit 215 examines the stored NAND address and enables the CE pin of the target NAND storage device 120 to which the NAND address corresponds. Thus, if the NAND address is AA, control unit 215 enables a communication path to (i.e., asserts the CE pin of) NAND storage device 120$_1$. Similarly, if the NAND address is BB, control unit 215 enables a communication path to NAND storage device 120$_2$, and so on.

As shown in FIG. 4A, address 400 also comprises a LUN address, a block address, and a page address. Control unit 215 stores these address components, along with the NAND address, in buffer 212. Typically, the page address, block address, and LUN address are collectively referred to as a row address. In embodiments, a row address may be combined with a column address (another address component) in order to form a complete address within a NAND storage device 120. Typically, each of the components of address 400 is 8 bits long. Since there are 4 components in address 400, up to $2^{32}$ unique row addresses may be used.

Figure 4B:
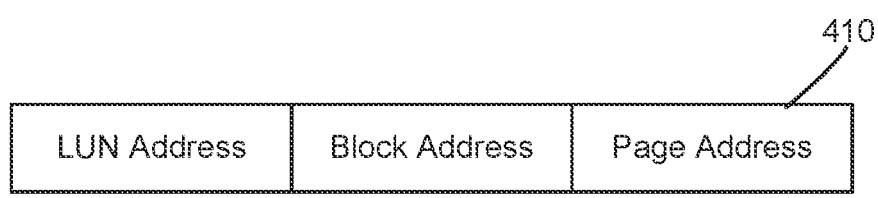
FIG. 4B is a block diagram that depicts address components that are transmitted from a NAND array controller to a target NAND storage device, according to one or more embodiments.

FIG. 4B is a block diagram that depicts the address components that are transmitted from NAND array controller 110 to a target NAND storage device 120, according to one or more embodiments. As shown, address 410 comprises a LUN address, a block address, and a page address. As previously mentioned, the page, block, and LUN addresses comprise a row address for a NAND storage device 120, and each of the components of address 410 is typically 8 bits in length. Thus, there are up to $2^{24}$ unique row addresses for address 410. Address 410 is derived from address 400 by control unit 215.

As mentioned previously, control unit 215 stores a complete command transmission (comprising a command code, one or more addresses, and storage data) in buffer 212. Thus, control unit 215 stores each of the components of address 400 in buffer 212. After storing address 400, control unit 215 examines the NAND address component of address 400 (i.e., the high-order bits depicted in FIG. 4A) and determines which target NAND storage device 120 corresponds to the NAND address. After determining the target NAND storage device 120, control unit 215 transmits the components of address 410 (which correspond to the LUN address, the block address, and the page address of address 400) to IP 211, which, in turn, converts and transmits the addresses according to the data protocol used by SSD controller 100. By using addresses 400 and 410, SSD controller 100 is able to access size $2^{32}$ row addresses by using a NAND array controller 110 and one or more NAND storage devices 120, each of which may address $2^{24}$ rows.

Figure 5A:
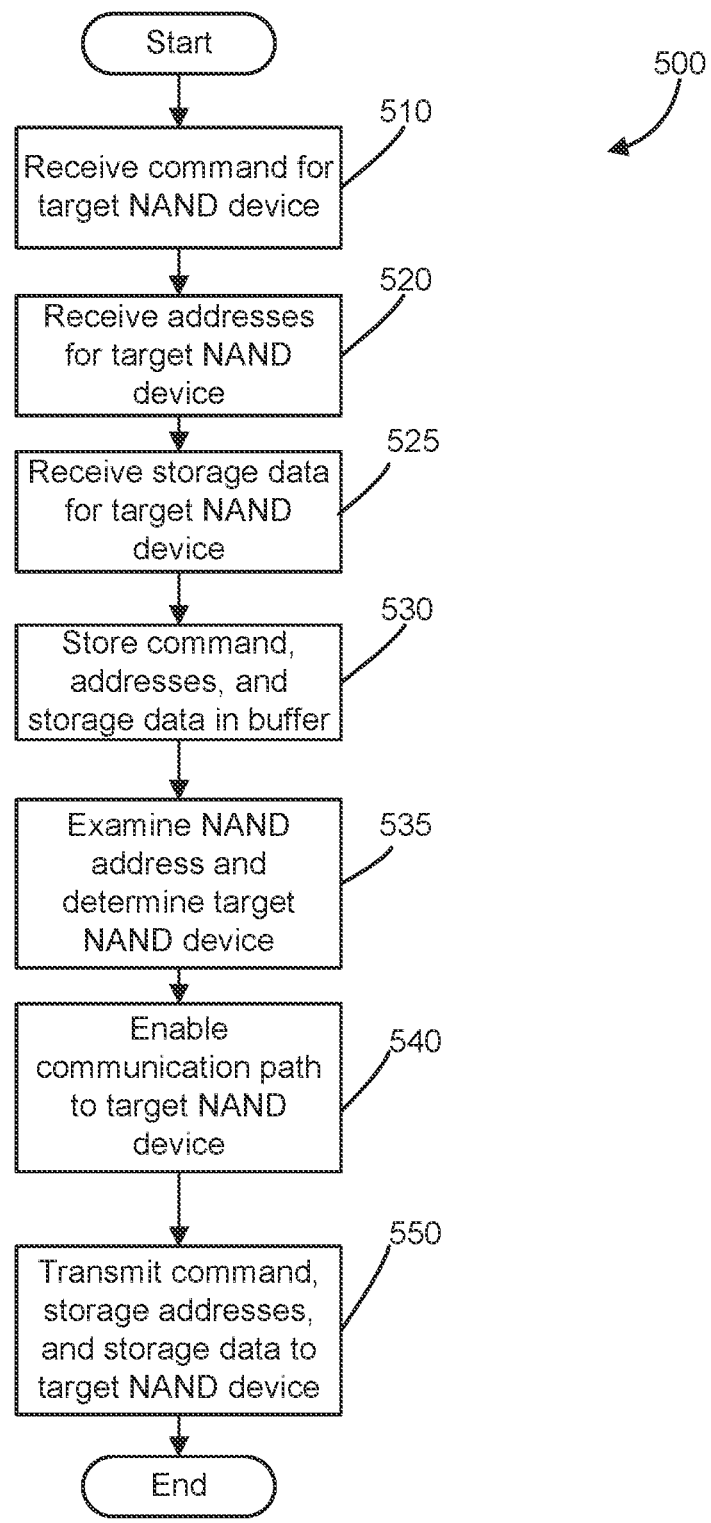
FIG. 5A is a flow diagram that illustrates a method of enabling a communication path between an SSD controller and a target NAND storage device using a NAND array controller, according to a first embodiment.

FIG. 5A is a flow diagram that illustrates a method 500 of enabling a communication path between an SSD controller 100 and a target NAND storage device 120 using a NAND array controller 110, according to a first embodiment. FIG. 5A is described in conjunction with FIG. 5B, which is a signal diagram that depicts the timing of signals received and transmitted by NAND array controller 110 at the various steps in method 500.

Figure 5B:
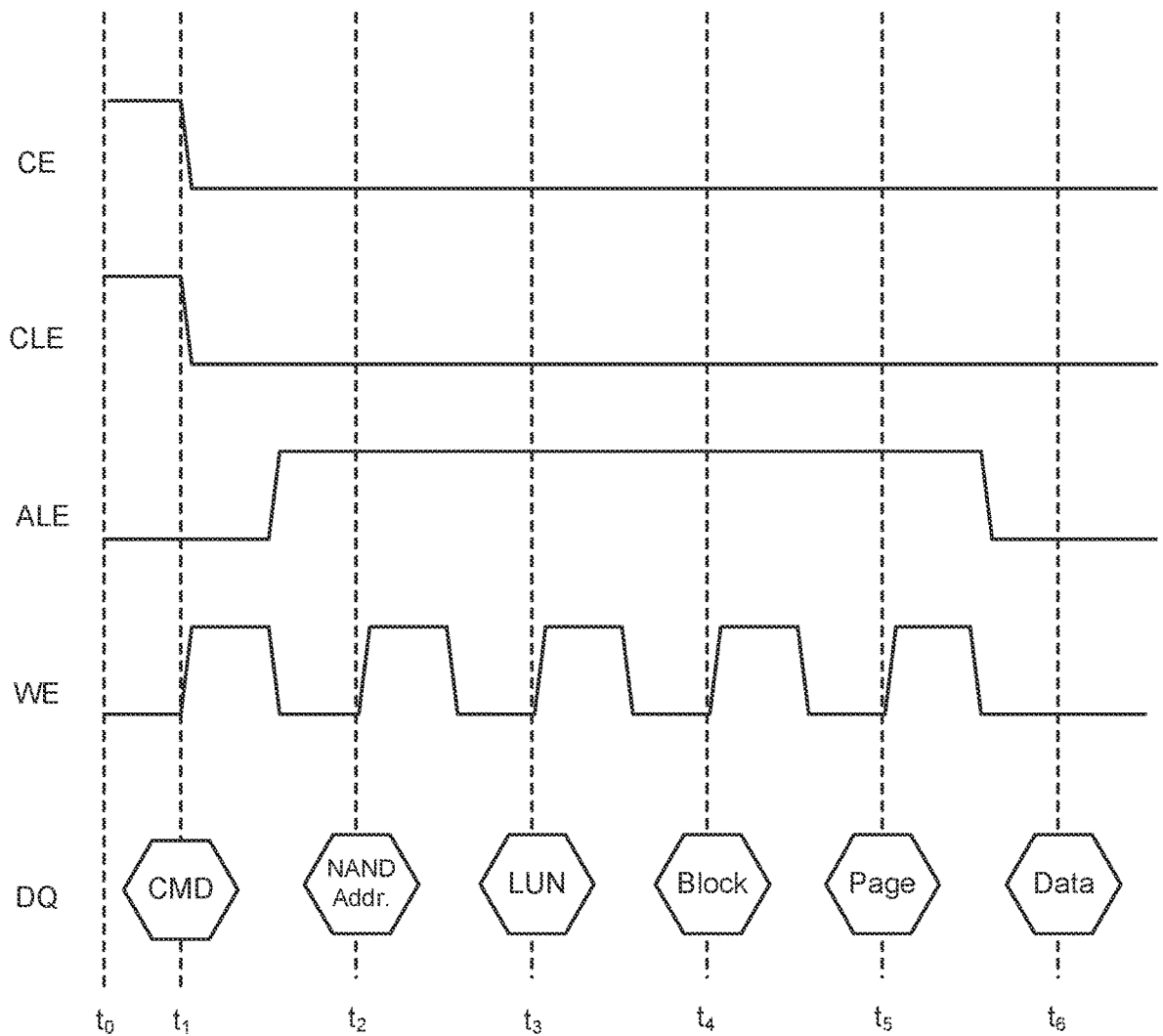
FIG. 5B is a signal diagram that depicts the timing of signals received by a NAND array controller in one or more embodiments.

Method 500 begins at step 510, where a NAND array controller 110 receives a command from SSD controller 100 for a target NAND storage device 120. As previously mentioned, a command may be an op code that a target NAND storage device 120 executes, such as an op code for a read command or for a write command. In FIG. 5B, the command received at step 510 is received at time $t_1$. Note that, prior to time $t_1$, the CLE pin of NAND array controller 110 is asserted and the ALE pin of NAND array controller 110 is not asserted, indicating that a command is to be received at a subsequent clock cycle. Further, it should be noted that, at time $t_1$, pin WE is asserted, thus triggering NAND array controller 110 to received data from the data bus.

Next, at step 520, NAND array controller 110 receives from SSD controller 100 one or more addresses for a target NAND device 120. The receipt of the addresses is depicted in FIG. 5B as occurring at times $t_2$, $t_3$, $t_4$, and $t_5$. It should be noted that, prior to time $t_2$, pin CLE of NAND array controller 110 is de-asserted while pin ALE of NAND array controller 110 is asserted. As previously mentioned, this assertion pattern indicates that an address is to be transmitted over the data bus during a subsequent clock cycle. It should be noted that any number of addresses may be received during step 520 and that the receipt of the four addresses shown is for the purpose of illustration.

In addition, at time $t_2$, NAND array controller 110 receives a NAND address. A NAND address refers to a particular NAND storage device 120 that is connected to the NAND array controller 110. In addition, at time $t_3$ NAND array controller 110 receives a LUN address, at time $t_4$ NAND array controller 110 receives a block address, and at time $t_5$ NAND array controller 110 receives a page address. As previously mentioned, a LUN address, a block address, and a page address comprise the address of a row within a NAND storage device 120.

At step 525, NAND array controller 110 receives from SSD controller 100 storage data that is to be stored in the target NAND storage device 120. In embodiments, the data received at step 525 may be received during a single clock cycle. In other embodiments, the data received at step 525 may be received over multiple clock cycles. As shown in FIG. 5B, the data is received over DQ at time $t_6$. It is to be noted that, prior to receiving the data, both pins CLE and ALE are de-asserted, which indicates to NAND array controller 110 that data to be received over a subsequent clock cycle comprises storage data (i.e., data to be stored within a target NAND storage device 120).

After step 525, method 500 proceeds to step 530. At step 530, having received a command for the target NAND storage device, a NAND address, one or more addresses of storage locations within the target NAND storage device 120, and data to be stored at the storage locations within the target NAND storage device 120, NAND array controller 110 stores the received data in buffer 212.

Next, at step 530, NAND array controller 110 examines the NAND address stored in buffer 212 in order to determine the target NAND storage device 120 that is to receive the stored command, addresses, and data.

Based on the determination performed at step 530, NAND array controller 110, at step 540, enables a communication path to the target NAND device 120. In embodiments, the enablement of a communication path to a target NAND device 120 is performed by asserting an Out_CE pin that is connected to a CE pin of the target NAND device 120. For example, referring to FIG. 3, if the NAND address received at step 520, and stored in buffer 212 at step 530, refers to NAND storage device $120_1$, then NAND array controller 110 asserts pin Out_CE0, which, as shown in FIG. 3, is connected to the CE pin of NAND storage device $120_1$.

After a communication path to a target NAND storage device 120 is enabled at step 540, method 500 proceeds to step 550. At step 550, NAND array controller 110 transmits the command, storage location addresses, and storage data to the target NAND storage device 120. In embodiments, and with reference to FIG. 3, control unit 215 reads the command, storage location addresses, and storage data from buffer 212 and transmits this data to IP 211. IP 211, which is the protocol interface for NAND array controller 110, converts and transmits the command, addresses, and storage data to the target NAND storage device 120 over the data bus through pins Out_DQ. It is to be noted that control unit 215 does not transmit the NAND address to IP 211. The NAND address is only used by control unit 215 to determine the target NAND storage device 120 to which a communication path is to be enabled.

Further, IP 211, when transmitting the command, addresses, and storage data to the target NAND storage device 120, does so according to the protocol that SSD controller 100 uses to communicate with NAND devices. For example, in an environment where SSD controller 100 communicates using the Toggle/ONFI protocol, IP 211 transmits the command (i.e., a command op code) during a "command" clock cycle, where, prior to transmitting the command, IP 211 asserts an output CLE pin and de-asserts an output ALE pin of NAND array controller 110, which are connected to corresponding CLE and ALE pins of the target NAND storage device 120 (not shown). Similarly, IP 211 transmits the addresses during "address" clock cycles, where, prior to transmitting the addresses, IP 211 asserts an output ALE pin and de-asserts an output CLE pin of the NAND array controller 110. Finally, in similar fashion, IP 211 transmits the storage data over "data" clock cycles. In this case, both output CLE and ALE pins of NAND array controller 110 are de-asserted prior to transmitting the storage data over the data bus.

After NAND array controller 110, through IP 211, has transmitted the command, addresses, and data to the, method 500 terminates.

The embodiments described in FIGS. 1-5B may be referred to as "non-mirroring" embodiments. In such embodiments, NAND array controller 110 receives a complete command transmission for writing storage data to one or more storage locations in a target NAND storage device 120. As previously shown, NAND array controller 110 determines a target NAND storage device 120 based on a received NAND address, enables a communication path to the target NAND storage device 120, and then transmits the complete write command transmission (i.e., the write command op code, the addresses of storage locations within the target NAND storage device 120, and the storage data) to the target NAND storage device 120. The NAND address is not transmitted to the target NAND storage device 120. In a non-mirroring embodiment, NAND array controller 110 transmits the aforementioned write command transmission to a single target NAND storage device 120.

Figure 6A:
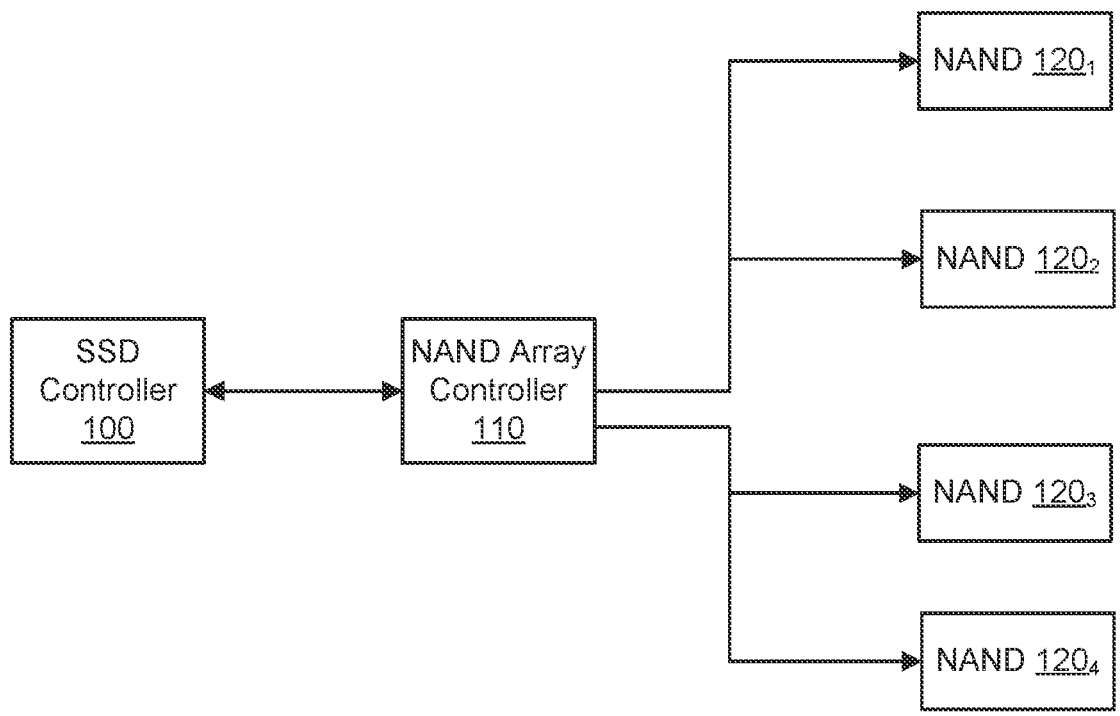
FIG. 6A is a block diagram that depicts an embodiment of a memory system that supports mirroring.

However, other embodiments of the present invention are referred to as "mirroring" embodiments. In a mirroring embodiment, a command transmission (typically, a write command) is transmitted not to a single target NAND storage device 120, but to two target NAND storage devices 120. An example of a mirroring embodiment is depicted in FIG. 6A. In FIG. 6A, SSD controller 100 transmits commands in a similar manner as the SSD controller 100 depicted in FIG. 1. NAND array controller 110 receives the commands SSD controller 100 transmits and, in turn, transmits commands to one or more NAND storage devices 120. In FIG. 6A, NAND array controller 110 is schematically depicted as connected over a single data path to both NAND storage devices $120_1$ and $120_2$. Similarly, NAND array controller 110 is connected to over a single data path to both NAND storage devices $120_3$ and $120_4$. The connections of FIG. 6A are shown in a manner to illustrate that write commands received for and transmitted to NAND storage device $120_1$ by NAND array controller 110 are also transmitted by NAND array controller 110 to NAND storage device $120_2$. In like manner, write commands that NAND array controller 110 receives for and transmits to NAND storage device $120_3$ are also transmitted to NAND storage device $120_4$. Thus, data that is stored at a particular storage location in one NAND storage device 120 is "mirrored" (i.e., the same data is stored at the same storage location in another (mirror) NAND storage device 120).

As an example, referring to FIG. 3, NAND array controller 110 may receive a complete command transmission for NAND storage device $120_1$. That is, NAND array controller 110 receives from SSD controller 100: a write command according to, for example, the Toggle/ONFI protocol, a NAND address identifying NAND storage device $120_1$, one or more addresses of storage locations within NAND storage device $120_1$, and storage data to be stored at the one or more storage locations within NAND storage device $120_1$. In a mirroring embodiment, NAND array controller 110 enables a communication path to both NAND storage device $120_1$ and to a mirror NAND storage device 120 (for example, in FIG. 3, to NAND storage device $120_2$). The communication path to each NAND storage device 120 is enabled, in embodiments, through asserting the appropriate Out_CE pins of NAND array controller 110. In this example, NAND array controller 110 asserts pin Out_CE0, which is connected to the CE pin of NAND storage device $120_1$, and asserts pin Out_CE1, which is connected to the CE pin of NAND storage device $120_2$. Since communication paths to each of NAND storage devices $120_1$ and $120_2$ are enabled, both of these devices receive commands, addresses, and storage data that NAND array controller 110 transmits over the data bus through pins Out_DQ.

Further, in mirroring embodiments, NAND array controller 110 is configured to recognize a corresponding mirror NAND storage device 120 for a target NAND storage device 120 that is identified by the NAND address received from SSD controller 100. For example, a NAND storage device 120 and its corresponding mirror NAND storage device 120 is defined in a hash table stored in memory within NAND array controller 110. Thus, in such an embodiment, and referring to FIG. 6A, NAND array controller 110 stores a hash table, where a first entry associates a NAND address for NAND storage device $120_1$ with a NAND address for NAND storage device $120_2$. In addition, a second hash table entry associates a NAND address for NAND storage device $120_3$ with a NAND address for NAND storage device $120_4$.

Note that a hash table is one example of a way of associating NAND addresses for NAND and mirror storage devices 120, and that other ways of associating NAND address, such as relational databases, text files, separate address transmissions, and the like, are within the scope of the present invention.

Figure 6B:
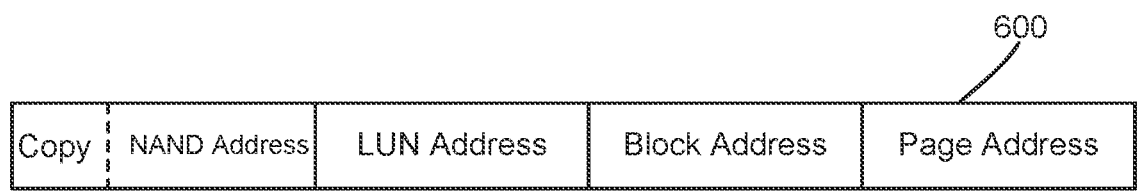
FIG. 6B is a block diagram that depicts address components that are transmitted from an SSD controller to a NAND array controller in an embodiment that supports mirroring.

FIG. 6B is a block diagram that depicts the address components that are transmitted from SSD controller 100 to NAND array controller 110, according to mirroring embodiments. As shown, address 600 comprises different segments, each of which is transmitted by SSD controller 100 during a separate clock cycle, referred to as an address cycle. As is the case for non-mirroring embodiments, an address cycle is preceded by SSD controller 100 asserting an Out_ALE pin and by de-asserting an Out_CLE pin, which, according to data protocols such as Toggle/ONFI, indicates to a target device that an address is to be transmitted over the data bus during a subsequent clock cycle. The first segment of address 600 is a NAND address. As previously mentioned, a NAND address is an address that identifies a particular NAND storage device 120 that is connected to a NAND array controller 110, and is used by a NAND array controller 110 to enable a communication path to the identified target NAND storage device 120. However, in the mirroring embodiment depicted in FIG. 6B, a NAND address includes a "copy" field. Note that the copy field is a single bit. The copy field indicates to NAND array controller 110 whether a particular NAND storage device 120 or its mirror device is to be accessed when a read command is issued in a current command transmission received from SSD controller 100. If the copy field is set to 0, then, in embodiments, a "primary" NAND storage device 120 is the target of the read command. If the copy field is set to 1, then the mirror device is the target of the read command. Since a NAND address is typically 8 bits in size, mirroring embodiments allow for 7 of the 8 bits in a NAND address to be used to identify a target NAND storage device 120. In such embodiments, the most significant bit (i.e., the left-most bit) of the NAND address indicates the target (primary or mirror) NAND storage device 120 to be accessed in connection with a read command.

For example, during a read operation, SSD controller 100 may transmit the hexadecimal address 8A as a NAND address in a mirroring embodiment. In this case, the bit pattern for the NAND address is 10001010. If a binary value of 1 in the most significant (i.e., the left-most) bit position indicates that a mirror device is to be the target of a read command, NAND array controller 110 determines the target NAND storage device 120 based on the lower-order 7 bits of the NAND address, namely, bits 0001010. In addition, NAND array controller 110 determines the mirror device that corresponds to the target NAND storage device 120. As previously mentioned, the corresponding mirror device may be determined, for example, using a hash table stored in the memory of NAND array controller 110.

As shown in FIG. 6B, address 600 also comprises a LUN address, a block address, and a page address. As was pointed out for non-mirroring embodiments, control unit 215 stores these address components, along with the NAND address, in buffer 212. Further, as previously mentioned, the page address, block address, and LUN address collectively comprise a row address, which, when combined with a column address, forms a complete address of a storage location within a NAND storage device 120. Further, since only 7 of the 8 bits of a NAND address are used to address a target NAND device in mirroring embodiments, NAND array controller 110 may address only $2^{31}$ unique row addresses in such embodiments. This is half the number of unique addresses available in non-mirroring embodiments, which, as previously mentioned, provide for $2^{32}$ unique row addresses.

Figure 7A:
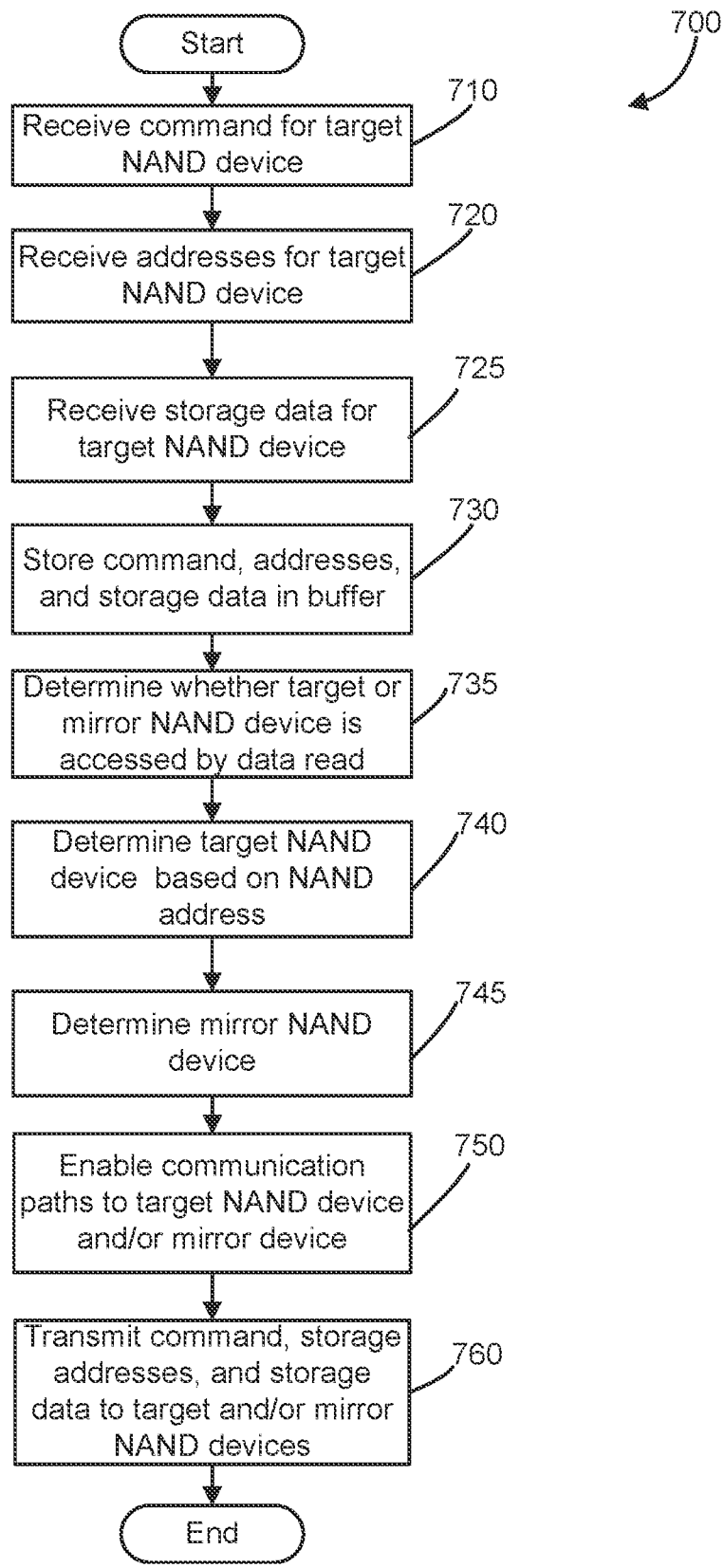
FIG. 7A is a flow diagram that illustrates a method of enabling a communication path between an SSD controller 100 and a target NAND storage device using a NAND array controller, according to embodiments that support mirroring.

FIG. 7A is a flow diagram that illustrates a method 700 of enabling a communication path between an SSD controller 100 and a target NAND storage device 120 using a NAND array controller 110, according to mirroring embodiments. FIG. 7A is described in conjunction with FIG. 7B, which is a signal diagram that depicts the timing of signals received by NAND array controller 110 at various steps in method 700.

Figure 7B:
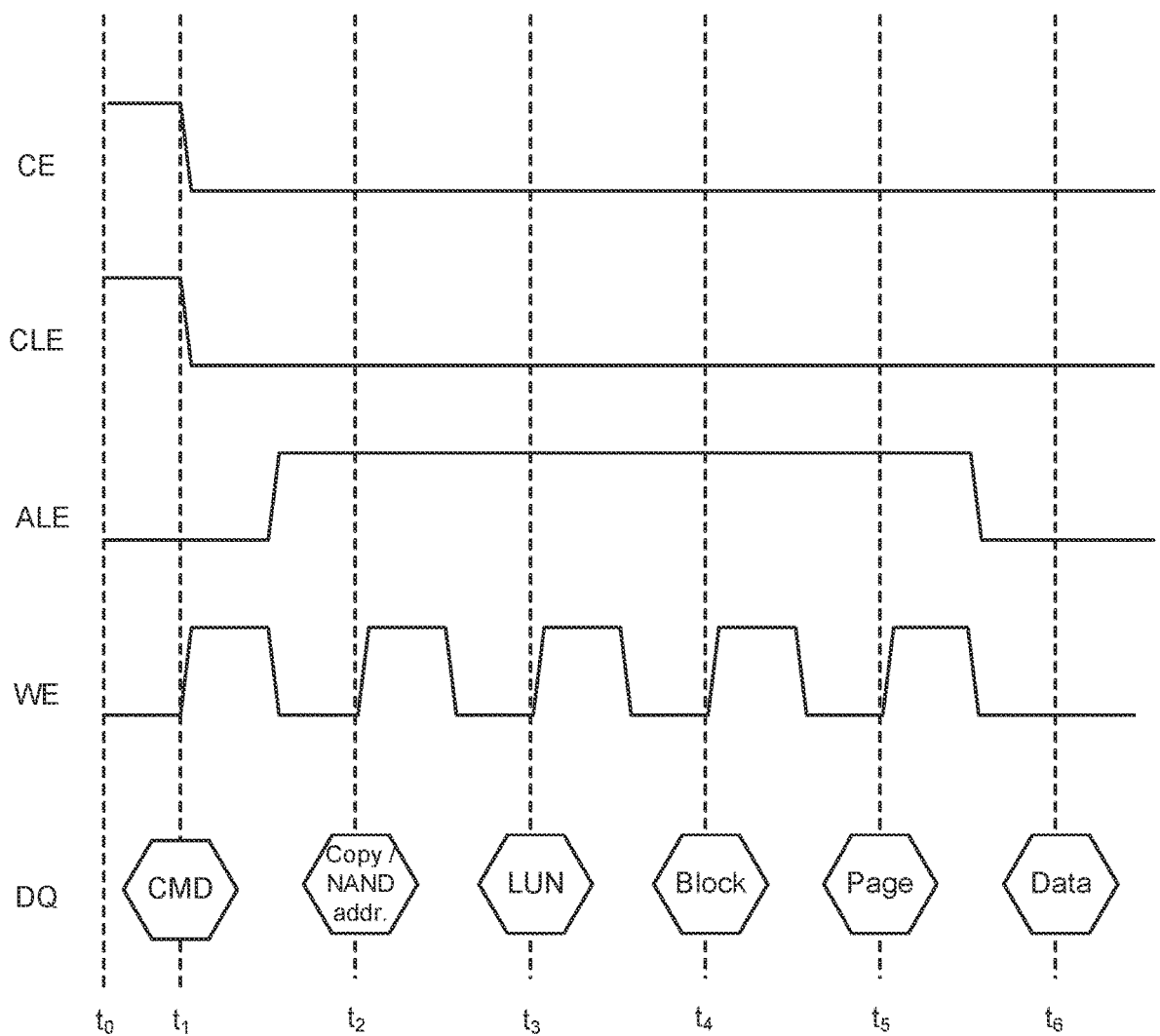
FIG. 7B is a signal diagram that depicts the timing of signals received by a NAND array controller in an embodiment that supports mirroring.

Method 700 begins at step 710, where a NAND array controller 110 receives a command for a target NAND storage device 120 from SSD controller 100. As was previously described, the received command may be an op code that a target NAND storage device 120 executes, such as a read command or write command. In FIG. 7B, the command received at step 710 is received at time $t_1$. Note that, prior to time $t_1$, the CLE pin is of NAND array controller 110 is asserted and the ALE pin of NAND array controller 110 is not asserted, indicating that a command is to be received at a subsequent clock cycle. Further, it should be noted that, at time $t_1$, pin WE of NAND array controller 110 is asserted, which triggers NAND array controller 110 to receive data from the data bus.

Next, at step 720, NAND array controller 110 receives from SSD controller 100 one or more addresses for a target NAND device 120. The receipt of the addresses is depicted in FIG. 7B as occurring at times $t_2$, $t_3$, $t_4$, and $t_5$. It should be noted that, prior to time $t_2$, pin CLE of NAND array controller 110 is de-asserted and pin ALE of NAND array controller 110 is asserted. As previously mentioned, this assertion pattern indicates to NAND array controller 110 that an address is to be transmitted over the data bus during a subsequent clock cycle. Further, at time $t_2$, NAND array controller 110 receives a NAND address. In mirroring embodiments, a portion of the NAND address (typically, the lower order bits) identifies a particular NAND storage device 120 that is connected to the NAND array controller 110. For example, where a NAND address is 8 bits in size, the lower-order 7 bits of the NAND address identifies a particular NAND storage device 120. The highest order bit is a copy bit, which indicates the particular NAND storage device 120 or a mirror NAND storage device 120 is to be accessed when a read command is received at step 710. In one or more embodiments, if the highest order bit of the NAND address is a 1, then the mirror NAND storage device 120 is accessed.

As shown in FIG. 7B, at time $t_3$ NAND array controller 110 receives a LUN address, at time $t_4$ NAND array controller 110 receives a block address, and at time $t_5$ NAND array controller 110 receives a page address. As previously mentioned, a LUN address, a block address, and a page address comprise the address of a row within a NAND storage device 120.

At step 725, NAND array controller 110 receives data that is to be stored in the target NAND storage device 120. In embodiments, the data received at step 725 may be received during a single clock cycle. In other embodiments, the data received at step 725 may be received over multiple clock cycles. As shown in FIG. 7B, the data is received during a single clock cycle at time $t_6$. As was the case for non-mirroring embodiments, prior to receiving the data, both pins CLE and ALE of NAND array controller 110 are de-asserted. This indicates to NAND array controller 110 that data subsequently received over the data bus comprises data to be stored to a target NAND storage device 120.

Method 700 then proceeds to step 730. Having received a command for the target NAND storage device, one or more addresses for the target NAND storage device 120, and data to be stored at storage locations within the target NAND storage device 120, NAND array controller 110, at step 730, stores the received data in buffer 212.

Next, at step 735, NAND array controller 110 determines, in the event that a read command is received at step 710, whether a NAND storage device 120 or a mirror storage device 120 is to be accessed. In embodiments, NAND array controller reads the NAND address stored in buffer 212 and makes the determination by examining the highest order bit of the NAND address.

Method 700 then proceeds to step 740. At step 740, NAND array controller 110 determines the target NAND storage device 120 that is to receive the command, addresses, and storage data.

At step 745, NAND array controller 110 determines a mirror NAND storage device 120 based on the NAND address. As was previously described, a NAND storage device 120 and its corresponding mirror NAND storage device 120 may be defined in a hash table stored in memory within NAND array controller 110.

Based on the determinations made at steps 735, 740, and 745, NAND array controller 110, at step 750, enables a communication path to the target NAND storage device 120 and/or to the mirror NAND storage device 120. In the event that a write command is received at step 710, NAND array controller 110 enables a communication path to both the target NAND storage device 120 and to the mirror NAND storage device 120. In the event that a read command is received at step 710, NAND array controller 110 enables a communication path to either of the target NAND storage device 120 or to the mirror NAND storage device 120, based on the setting of the highest order bit of the NAND address determined in step 735. In embodiments, the enablement of a communication path to the target NAND storage device 120 and/or to the mirror NAND storage device 120 is performed by asserting appropriate Out_CE pins that are each connected to the target and mirror NAND storage devices. For example, in view of FIG. 3, assume the NAND address received over the data bus at step 720 identifies NAND storage device $120_1$. Further, assume that NAND array controller 110 associates (through, for example, a hash table entry) NAND storage device $120_1$ with a mirror NAND storage device $120_2$. Further, assume that a write command has been received by the NAND array controller 110. In such a case, NAND array controller 110 asserts both pins Out_CE0 and Out_CE1, which are connected, respectively to the CE pins of NAND storage devices $120_1$ and $120_2$.

After communication paths to a target NAND storage device 120 and to a mirror NAND storage device 120 are enabled at step 750, method 700 proceeds to step 760. At step 760, NAND array controller 110 transmits the command, addresses, and data to the target NAND storage device 120 and to the mirror NAND storage device 120. Note that the command, addresses, and data are transmitted to both NAND and mirror storage devices 120 in the event that a write command has been received by NAND array controller 110. In the event that a read command is received, NAND array controller 110 transmits to only one of either the NAND storage device 120 or the mirror NAND storage device 120, based on the highest order bit of the NAND address. Referring to FIG. 3, the transmission of the command, addresses, and storage data is performed by control unit 215 and IP 211. Control unit 215 reads the command, addresses, and storage data from buffer 212 and transmits this data to IP 211. IP 211, which is the protocol interface for NAND array controller 110, then transmits the command, addresses, and storage data to the target NAND storage device 120 over the data bus through pins Out_DQ. It is to be noted that control unit 215 does not transmit the NAND address to IP 211. In this embodiment, the NAND address is only used by control unit 215 to determine whether a NAND storage device 120 or a mirror storage device 120 is a target of a read command (using the highest order bit), and to identify the target NAND storage device 120 to which a communication path is to be enabled (using the lower-order bits). Further, IP 211, when transmitting the command, addresses, and storage data to either or both the target NAND storage device 120 and the mirror NAND storage device 120, does so according to the protocol that SSD controller 100 uses to communicate with NAND devices, such as Toggle/ONFI. It is to be noted that when the command, addresses, and data are transmitted over Out_DQ, both the target NAND storage device 120 and the mirror NAND storage device 120 are configured to receive this data because communication paths to both storage devices are enabled at step 750.

After NAND array controller 110 transmits the command, addresses, and data to the target NAND storage device 120 and to the mirror NAND storage device, through IP 211, method 700 terminates.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A memory system comprising:
 a first controller that includes a data output connected to a first data bus and at least a first enable output and a second enable output each connected to one of a plurality of first communication paths;
 a plurality of non-volatile semiconductor memory devices including a first non-volatile semiconductor memory device and a second non-volatile semiconductor memory device; and
 a second controller connected to the first controller via the first data bus and one of the first communication paths, and connected to at least the first non-volatile semiconductor memory device and the second non-volatile semiconductor memory device via a second data bus and a plurality of second communication paths, the second controller including:
  a first enable input connected to the first enable output of the first controller via said one of the first communication paths,
  a third enable output connected to an enable input of the first non-volatile semiconductor memory device via one of the second communication paths, and
  a fourth enable output connected to an enable input of the second non-volatile semiconductor memory device via another one of the second communication paths,
 wherein the second controller is configured to assert one of the third and fourth enable outputs on the basis of the first enable input asserted and a command and address information received from the first controller.

2. The memory system according to claim 1, wherein the plurality of non-volatile semiconductor memory devices further includes a third non-volatile semiconductor memory device and a fourth non-volatile semiconductor memory device, and
 the memory system further comprises:
  a third controller connected to the first controller and the second controller via the first data bus, connected to the first controller via another one of the first communication paths, and connected to at least the third and fourth non-volatile semiconductor memory devices via a third data bus and a plurality of third communication paths, the third controller including:
   a second enable input connected to the second enable output of the first controller via said another one of the first communication paths,
   a fifth enable output connected to an enable input of the third non-volatile semiconductor memory device via one of the third communication paths, and
   a sixth enable output connected to an enable input of the fourth non-volatile semiconductor memory device via another one of the third communication paths,
 wherein the third controller is configured to assert one of the fifth and sixth enable outputs on the basis of the second enable input asserted and the command and the address information received from the first controller.

3. The memory system according to claim 1, wherein the address information identifies one of the non-volatile semiconductor memory devices.

4. The memory system according to claim 3, wherein the second controller is further configured to transmit a command on the basis of the command received from the first controller to one of the non-volatile semiconductor memory devices identified by the address information.

5. The memory system according to claim 4, wherein the second controller further includes a buffer configured to store data to be written into or data read from at least one of the first and second non-volatile semiconductor memory devices, and
 if the command is a write command, the second controller is further configured to store into the buffer write data to be written into the non-volatile semiconductor memory device identified by the address information.

6. The memory system according to claim 4, wherein
the second controller further includes a buffer configured to store data to be written into or data read from at least one of the first and second non-volatile semiconductor memory devices, and
if the command is a read command, the second controller is further configured to store into the buffer read data read from the non-volatile semiconductor memory device identified by the address information.

7. The memory system according to claim 1, wherein the first controller is further configured to:
transmit a data signal to the second controller via the first data bus, and
transmit an enable signal to the second controller via said one of the first communication paths.

8. The memory system according to claim 7, wherein the second controller is further configured to:
transmit data signals to the first and second non-volatile semiconductor memory devices via the second data bus, and
transmit enable signals to the first and second non-volatile semiconductor memory devices via the second communication paths.

9. The memory system according to claim 1, wherein the second controller further includes a data input for connection to the first data bus.

10. A method of performing read and write operations in a memory system comprising a first controller connected to a plurality of non-volatile semiconductor memory devices by way of a plurality of second controllers, wherein the first controller includes a plurality of enable outputs connected respectively to the second controllers via a plurality of communication paths and a data output connected to each second controller via a first data bus, the method comprising:
asserting one of the enable outputs of the first controller to activate a second controller connected to the asserted enable output via one of the communication paths;
transmitting a command and address information from the first controller to the activated second controller from the data output via the first data bus;
at the activated second controller, determining, on the basis of the transmitted command and address information, one of the non-volatile semiconductor memory devices targeted by the command; and
transmitting the command to the targeted non-volatile semiconductor memory device via a second data bus.

11. The method according to claim 10, wherein
the address information identifies one of the non-volatile semiconductor memory devices.

12. The method according to claim 10, wherein
the command is a write command, and
the method further comprises buffering to the activated second controller write data to be written into the targeted non-volatile semiconductor memory device.

13. The method according to claim 10, wherein
the command is a read command, and
the method further comprises buffering to the activated second controller read data read from the targeted non-volatile semiconductor memory device.

14. The method according to claim 10, further comprising:
upon determining the targeted non-volatile semiconductor memory device, asserting an enable output of the activated second controller that is connected to an enable input of the targeted non-volatile semiconductor memory device.

15. The method according to claim 10, wherein
each of the second controllers further includes a data input for connection to the first data bus, and a chip enable input for connection to one of the communication paths.

* * * * *